United States Patent [19]
Buringer

[11] Patent Number: 6,042,705
[45] Date of Patent: Mar. 28, 2000

[54] PORTABLE DEVICE FOR DEIONIZING LIQUIDS

[76] Inventor: Hans Buringer, 4319 White Pine La., Villa Bel Vue, Calif.

[21] Appl. No.: 09/000,993

[22] Filed: Dec. 30, 1997

[51] Int. Cl.[7] ....................................................... C25B 9/00
[52] U.S. Cl. ................................................ 204/271
[58] Field of Search ............................................. 204/271

[56] References Cited

U.S. PATENT DOCUMENTS

| | | | |
|---|---|---|---|
| 512,970 | 1/1894 | Johanson | 204/271 |
| 1,217,643 | 2/1917 | Schneider | 204/271 |
| 1,446,029 | 2/1923 | Beidler | 204/271 |
| 2,042,534 | 6/1936 | Krause | 204/271 |
| 2,121,875 | 6/1938 | Kruse et al. | 204/271 |
| 4,319,971 | 3/1982 | Good et al. | 204/271 |
| 4,769,119 | 9/1988 | Grundler | 204/229.7 |
| 4,888,098 | 12/1989 | Nyberg et al. | 204/1 R |
| 5,217,587 | 6/1993 | Bridger et al. | 204/149 |
| 5,584,981 | 12/1996 | Turner et al. | 204/536 |

FOREIGN PATENT DOCUMENTS

| | | |
|---|---|---|
| 57-068189 | 4/1982 | Japan . |
| 57-068189A2 | 4/1982 | Japan . |

*Primary Examiner*—Kathryn Gorgos
*Assistant Examiner*—Thomas H. Parsons
*Attorney, Agent, or Firm*—Jeffer, Mangels, Butler & Marmaro LLP

[57] ABSTRACT

There is provided a self-contained, portable device for removing ions from a liquid. The device includes an upper housing shaped to be fittable within a human hand. The device further includes a source of electric current contained in the upper housing and an anode electrically connectable to the source of electric current. The anode is attached to the upper housing, and the anode is formed of a non-ionizable metal. The device also includes a cathode electrically connectable to the source of direct electric current. The cathode is attached to the upper housing, and the cathode is formed of a non-ionizable metal. The device also includes a switch for electrically connecting the anode, the cathode and the source of electric current, and a removable lower housing which surrounds the anode and the cathode.

4 Claims, 3 Drawing Sheets

PORTABLE DEVICE FOR DEIONIZING LIQUIDS

FIELD OF THE INVENTION

The present invention relates to a device which can be easily transported, manually held and operated and which is used to remove ions such as sulfites from a liquid, such as wine.

BACKGROUND OF THE INVENTION

Ionic substances, such as sulfites, are added to various beverages such as wine and can be found in other beverages such as fruit juices and beer. Sulfites provide an antioxidant function which helps to preserve the taste and freshness of the beverages to which it is added. However, sulfites can and do cause moderate to severe allergic reactions, including anaphylactic shock, which can be life-threatening, in a non-trivial percentage of the human population. Therefore, while it is desirable that sulfites be used to preserve the freshness of beverages, it is also desirable to be able to remove sulfites from a beverage just prior to consumption of the beverage by a person who is or may be allergic to sulfites.

Accordingly, the present invention was developed to allow a person to carry a small device with them, for example as one would carry a pen, which the person can use to remove ions, such as sulfites, from a beverage which might contain sulfites immediately before drinking the beverage.

SUMMARY OF THE PREFERRED EMBODIMENTS

In accordance with one aspect of the present invention, there is provided a self-contained, portable device for removing ions from a liquid. The device preferably includes an upper housing shaped to be fittable within a human hand, a source of electric current, an anode and a cathode electrically connectable to the source of direct electric current formed of a non-ionizable metal, and a switch for electrically connecting the anode, the cathode and the source of electric current.

In employing the device, a person grasps the upper housing of the device, activates the switch and places the anode and cathode into the liquid for a period of time sufficient to remove the desired ions, and then removes the anode and cathode from the liquid and thereafter deactivates the switch. As a result, ions are removed from the liquid.

Other features and advantages of the invention will become apparent from the following detailed description, taken in conjunction with the accompanying drawings which illustrate, by way of example, various features of preferred embodiments of the invention.

DESCRIPTION OF THE FIGURES

The detailed description of the invention will be made with reference to the accompanying drawings, where like numerals designate corresponding parts of the figures. The drawings are meant to be generally illustrative of various examples of the present invention, but are merely an example and are not meant to be limiting of the scope of the invention.

DETAILED DESCRIPTION OF THE INVENTION

Figure 1:
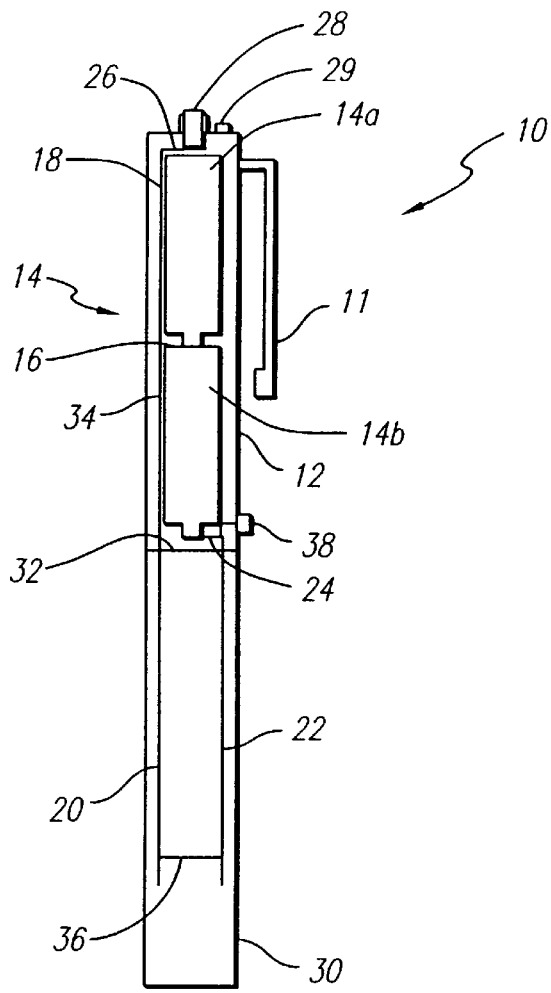
FIG. 1 is a schematic cross-sectional view of one embodiment of a deionizing device of the present invention.

As depicted in FIG. 1, liquid deionizing device 10 includes an upper housing 12 which is preferably shaped to be easily graspable by a human hand. In the particular embodiment depicted, upper housing 12 is configured to resemble and function as the top portion of a pen such as a two piece ball point pen. It is to be understood that other shapes are within the scope of the present invention. Upper housing 12 can be formed of, for example, plastic, metal and combinations thereof. Upper housing 12 is preferably about 4 cm to about 8 cm in length and about 1 cm in diameter.

Liquid deionizing device 10 is suitable for use with any non-corrosive liquids. Device 10 is most preferably suited for use with beverages which may contain objectionable ionic substances, in particular, but not limited to sulfites, such as potassium sulfites, sodium sulfites and the like. As previously mentioned, sulfites are added to various beverages such as wine and can be found in other beverages such as fruit juices and beer. Sulfites provide an antioxidant function which helps to preserve the taste and freshness of the beverages to which it is added. However, sulfites can and do cause moderate to severe allergic reactions, including anaphylactic shock, which can be life-threatening, in a non-trivial percentage of the human population. Device 10 allows a consumer of a beverage which may contain objectionable ionic substances, such as sulfites, to remove those substances prior to consuming the beverage. In this regard, device 10 is available in at least two embodiments. In one embodiment, device 10 is to be used to deionize a beverage in an person's glass. The person inserts a portion of device 10 in a liquid in their glass, activates a switch, leaves the portion of device 10 in the liquid in the glass for a period of time, removes the portion of device 10 from the liquid and then deactivates the switch. Alternatively, the person could engage the edge of the glass with, for example, lip 11 so that the anode and cathode are positioned in the liquid.

While it is not believed to be necessary, the person may swirl the liquid about gently to introduce fresh liquid to the surface of the anode and cathode.

In an alternative embodiment, device 10 is to be used to deionize the contents of a bottle, such as a wine bottle. The embodiment described above could be used for this purpose, although, the portion of device 10, namely, an anode and a cathode, as described in more detail below, inserted into the liquid, would typically be longer than those provided in device 10 for use in an individual glass. Preferably, device 10 for use in a bottle includes a bottle engaging portion which securely positions it in the bottle. For example, this portion could include a portion which attached to the bottle, and particularly which could be inserted in the orifice of the bottle as a wine bottle cork shaped body from which the anode and cathode depend. Alternatively, a frame which held device 10 and surrounded the bottle and was stabilized by the surface on which the bottle was placed could be used.

Device 10 includes a source of electric current 14a and 14b, which provides current to anode 20 and cathode 22. In the embodiment depicted current sources 14a and 14b comprises batteries 14a and 14b connected in series. The current source can be direct or alternating, however, it is preferable that the current supplied to anode 20 and cathode 22 be direct current, for reasons described below with respect to the function of the device. When current sources such as batteries are used, direct current is supplied without the use of any additional apparatus. If an alternating current source, such as wall current, is used, it is preferable to use an AC to DC converter (not shown) that may include a rectifier to convert the current from AC to DC. Other sources of current such as solar cells, which can be included on device 10, are within the scope of the invention. The current supplied is preferably supplied at a voltage which allows for removal of at least 50%, more preferably at least 75% and even more preferably at least about 95% of the ions in a liter or less of the liquid in about 5 to about 10 seconds but which does not increase the temperature of the liquid by more than about 5 degrees C. Voltages which can meet these criteria are between about 1.5 V and about 40 V, more preferably between about 5 V and about 30 V and most preferably between about 12 V and about 24 V. If wall current is used a step-down transformer (not shown) can provide current in the specified voltage ranges. Batteries are available which, alone or in combination, will supply the specified voltage ranges. Batteries can be arranged in series or in parallel.

Anode 20 is electrically connectable to negative end 18 of current source 14a through contact portion 26. Anode 20 can preferably be attached to upper housing 12 through plate 32 which is formed of an electrically non-conducting material. Plate 32 is disposed in housing 12 and retained therein by adhesives or mechanical means such as threads disposed on an edge of plate 32 which engage corresponding threads on the inside of upper housing 12. The plate 32 can be replaced with a longer threaded connector 33 as shown on FIG. 4. Upper portion 12 can be threadingly connected to connector 33, and lower portion 30 can also be threadingly connected to connector 33 or can be snap fitted, like a pen. Alternatively or additionally, anode 20 can be attached to upper housing 12 through anode retainer portion 34. Anode retainer portion 34 can provide, for example, a slot or a groove which the anode can engage. Alternatively, anode 20 can be adhered directly to an inside surface of upper housing 12.

Anode 20 is connected to negative end 18 of battery 14a through connecting portion 26. Anode 20 is negatively charged and accordingly attracts positively charged ions known as cations. Representative cations which anode 20 can attract and which are commonly found in beverages include $K^{30}$ and $Na^+$.

Anode 20 is formed of a preferably non-ionizable material, more preferably a metal, which term includes alloys, which conducts electricity. By non-ionizable material is meant that as current flows through anode 20, ions of the material which are undesirable to a drinker of the liquid are not transferred to a liquid in which anode 20 is immersed. Examples of metals suitable to form anode 20 are steel, preferably stainless steel, iron, platinum, palladium, nickel, combinations thereof and alloys thereof. However, it is to be understood that other metals which are electrically conductive and are preferably non-ionizable are within the scope of the present invention. Anode 20 is preferably formed from a wire thick enough to provide some rigidity and decrease the likelihood of breakage of the anode in normal usage, and to decrease the resistivity of the anode below that required for adequate usage of the anode. Anode 20 can be preferably from about 0.1 mm to about 2 mm in thickness and more preferably from about 0.5 mm to about 1 mm in thickness. Anode 20 can have a circular or a non-circular cross-section. Preferably, anode 20 is formed so as to increase the surface area of anode 20 to maximize the number of sites of ionic attraction between the anode and cations in solution in a liquid in which the anode is immersed. The surface area of anode 20 can be increased in a number of ways, which can be used alone or in combination. The metal forming anode 20 can have scratches and/or indentations and/or protrusions formed on its surface, thereby increasing the surface area per unit length of anode 20. These surface features can be obtained by, for example, acid washing or sanding the surface of the metal forming the anode. Preferably, anode 20 is coiled in the form of a helix which also increases the surface area per linear unit of anode 20. The diameter of the helical coil of anode 20 is preferably from about 0.5 mm to about 3 mm and more preferably from about 1.0 mm to about 1.5 mm. The helix is preferably tightly coiled to further increase the surface area of the anode per unit length of the anode. However, it is preferable that the helix not be so tightly soiled that there is no space between adjacent coils, as this will decrease the surface area of anode 20 and restrict the flow of liquid around and through the coiled anode.

The length of the anode from the point of its insertion at plate 32 to its other end is preferably from about 1 cm to about 20 cm, and more preferably from about 5 cm to about 10 cm. If anode 20 is a coiled anode, then the uncoiled length of anode 20 is preferably from about 6 cm to about 120 cm and more preferably from about 30 cm to about 60 cm.

Cathode 22 is connected to positive end 16 of battery 14b, preferably through cathode connecting portion 24. Portion 24 is formed of a conductive material, preferably metal, and most preferably the same metal as forms cathode 22. Portion 24 also attaches cathode 22 to upper housing 12. Cathode 22 is positively charged and accordingly attracts negatively charged ions known as anions. Representative anions which cathode 22 can attract and which are commonly found in beverages include $SO_3^{-2}$ or sulfites.

Cathode 22 is formed of a preferably non-ionizable material, more preferably a metal, which term includes alloys thereof, which conducts electricity. By non-ionizable material is meant that as current flows through cathode 22, ions of the material are not transferred to a liquid in which cathode 22 is immersed. Examples of metals suitable to form cathode 22 are steel, preferably stainless steel, iron, platinum, palladium, nickel, combinations thereof and alloys thereof. However, it is to be understood that other metals which are electrically conductive and are preferably non-ionizable are within the scope of the present invention. Cathode 22 is preferably formed from a wire thick enough to provide some rigidity and decrease the likelihood of breakage of the anode in normal usage, and to decrease the resistivity of the anode below that required for adequate usage of the anode. Cathode 22 can be preferably from about 0.1 mm to about 2 mm in thickness and more preferably from about 0.5 mm to about 1 mm in thickness. Cathode 22 can have a circular or a non-circular cross-section. Preferably, cathode 22 is formed so as to increase the surface area of cathode 22 to maximize the number of sites of ionic attraction between the cathode and anions in solution in a liquid in which the cathode is immersed. The surface area of cathode 22 can be increased in a number of ways, which can be used alone or in combination. The metal forming cathode 22 can have scratches and/or indentations and/or protrusions formed on its surface, thereby increasing the surface area per unit length of cathode 22. These surface features can be obtained by, for example, acid washing or sanding the surface of the metal forming the anode. Preferably, cathode 22 is coiled in the form of a helix which also increases the surface area per linear unit of cathode 22. The diameter of the helical coil of cathode 22 is preferably from about 0.5 to about 3 mm and more preferably from about 1.0 mm to about 1.5 mm. The helix is preferably tightly coiled to further increase the surface area of the anode per unit length of the anode. However, it is preferable that the helix not be so tightly coiled that there is no space between adjacent coils, as this will decrease the surface area of cathode 22 and restrict the flow of liquid around and through the coiled cathode.

The length of the cathode from its point of insertion in portion 24 to its other end is preferably about 1 cm to about 20 cm, and more preferably from about 5 cm to about 10 cm. If cathode 22 is a coiled cathode, then the uncoiled length of cathode 22 is preferably from about 6 cm to about 120 cm and more preferably from about 30 cm to about 60 cm.

The distance between anode 20 and cathode 22 is preferably from about 1 mm to about 10 mm and more preferably from about 2 mm to about 6 mm. Generally, as the distance between the anode and cathode increases the voltage of the current supplied should be increased to maintain the strength of the electric field between the anode and the cathode. A connector 36, which is preferably non-conducting can be used to strengthen and maintain proper separation between anode 20 and cathode 22.

Figure 2:
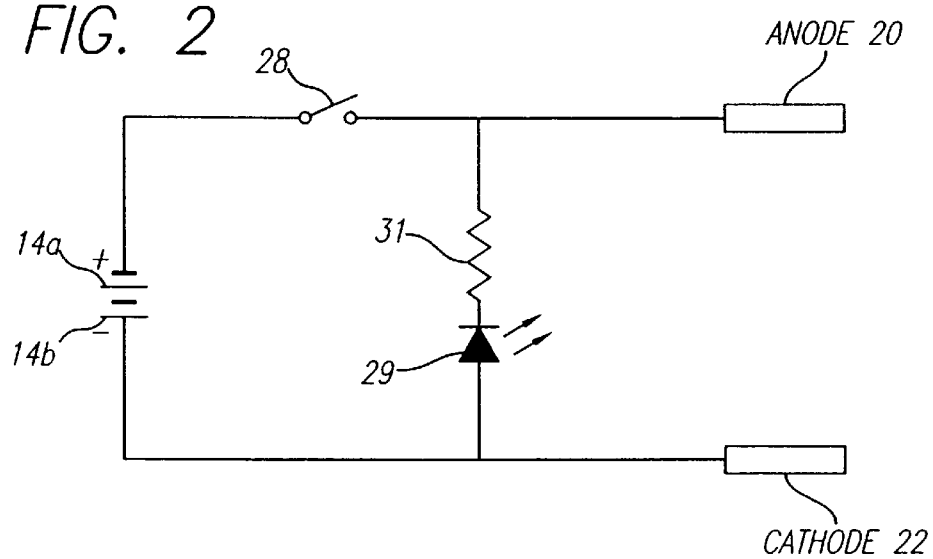
FIG. 2 is a circuit schematic of the electronic circuitry in an embodiment of the invention.

The circuit between anode 20, batteries 14a, 14b, and the cathode 22 shown in FIG. 2 can be completed by switch 28. Switch 28 can be activated by flipping the switch to the on position as in a toggle type of switch which is then inactivated by flipping the switch to the off position. Alternatively, a pressure sensitive switch can be used. The pressure sensitive switch can be activated by the constant application of pressure and inactivated when the pressure is removed. Alternatively, the pressure sensitive switch can act as a push button switch which is activated by an initial application of pressure and inactivated by a subsequent application of pressure. Alternatively, a sliding switch can be used. Light sensitive switches can be used which activate or inactivate in response to an increase or decrease in an amount of light reaching the switch. Other switch means for opening and closing an electrical circuit are within the scope of the invention. Electrically, switch 28 can be placed at any point in the circuit between the anode the source of current and the cathode shown in FIG. 1. From a mechanical standpoint, switch 28 is placed on upper housing 12 shown in FIG. 1.

In a preferred embodiment of the invention, the device further includes a human sensible indicator of electrical current flow to indicate when the device is turned on or off. The human sensible indicator of electrical current flow can include a light, or an LED 29 with an optional current limiting resistor 31 as shown in FIG. 2. Alternatively, or additionally, the indicator can include a position indicator of the switch 28 which either visually or through feel indicates if the switch is in the on or off position. Alternatively, the LED can be the switch 28 itself.

Removable lower housing 30 is preferably included to protect anode 20 and cathode 22. Lower housing 30 engages upper housing 12. Lower housing 30 can engage upper housing 12 by fitting within the interior of upper housing 12 or fitting about the exterior of upper housing 12. Lower housing 30 can engage upper housing 12 through, for example, a threaded engagement or through a friction fit. Lower housing 30 can be formed of, for example, plastic, metal and combinations thereof.

Device 10 optionally includes a clip 38 affixed to upper housing 12.

Device 10 can be used to deionize a liquid as follows: A person can carry device 10 with them, in for example, a shirt pocket. Upon being served a glass of, for example, wine at, for example, a restaurant, the person can remove the device from his or her pocket, remove lower housing 30, if so provided, and insert anode 20 and cathode 22 into the wine.

The switch can be activated before the anode and cathode are inserted in the liquid or after. The anode and cathode are left in the liquid for a period of time which depends on the voltage of the current supplied. Generally, the higher the voltage the less the period of time required to remove the ions from the liquid. Preferably, the voltage supplied allows for extraction of, for example, sulfites in a glass of wine from a level of about 10 ppm to about 30 ppm to about 1 ppm to about 2 ppm in about 5 to about 10 seconds. The voltage used should not heat the liquid to a point at which its sense characteristics such as taste and smell are affected or which will spoil the experience of consuming the beverage. For example, a chilled white wine should not be heated to room temperature in the time it takes to remove the ions therefrom.

Device 10 once inserted in the liquid with the switch closed operates as follows: Current flows from battery 14a into the anode 20, thereby negatively charging the anode. Positively charged cations, such as potassium or sodium are electrostatically attracted to the negatively charged anode. Simultaneously, current flows out of the cathode into battery 14b, thereby positively charging the cathode. Anions, such as sulfites are electrostatically attracted to the positively charged cathode. This flow of ions also completes the circuit between the anode and cathode as in a typical electrochemical cell. As long as the number of ion binding sites on the anode and cathode exceed the number of ions in solution, given enough time, all the ions should be removed from the solution. For convenience though, it is desired that a sufficient number of ions, which may be less than all, be removed in a short enough period of time, not more than about 20 seconds, not to unduly delay the period or time before the beverage can be consumed. It is thought that the number of ion binding sites on the anode and cathode is sufficient to remove sulfites at about 30 ppm from about 20 one quarter liters of wine. It is important that the current not be turned off while the anode and cathode are in the liquid or the ions will begin to migrate back into the liquid. In that regard the on/off indicator 29 allows a person to determine when to turn device 10 on and off. For this reason it is also preferred that the current ultimately provided to the anode and the cathode be direct current. If alternating current is used, it is possible that the ions in a liquid will migrate to and then from the anode and cathode, thereby completely or significantly reducing the effectiveness of device 10 in removing ions from the liquid.

Once the anode and cathode have been removed from the liquid they can be rinsed off in water, preferably distilled water, and the ions washed away, thereby regenerating the ion binding sites on the anode and cathode. Such a rinse can be done after each use or after up to about 20 uses when the ion binding sites are believed to be saturated.

Figure 3:
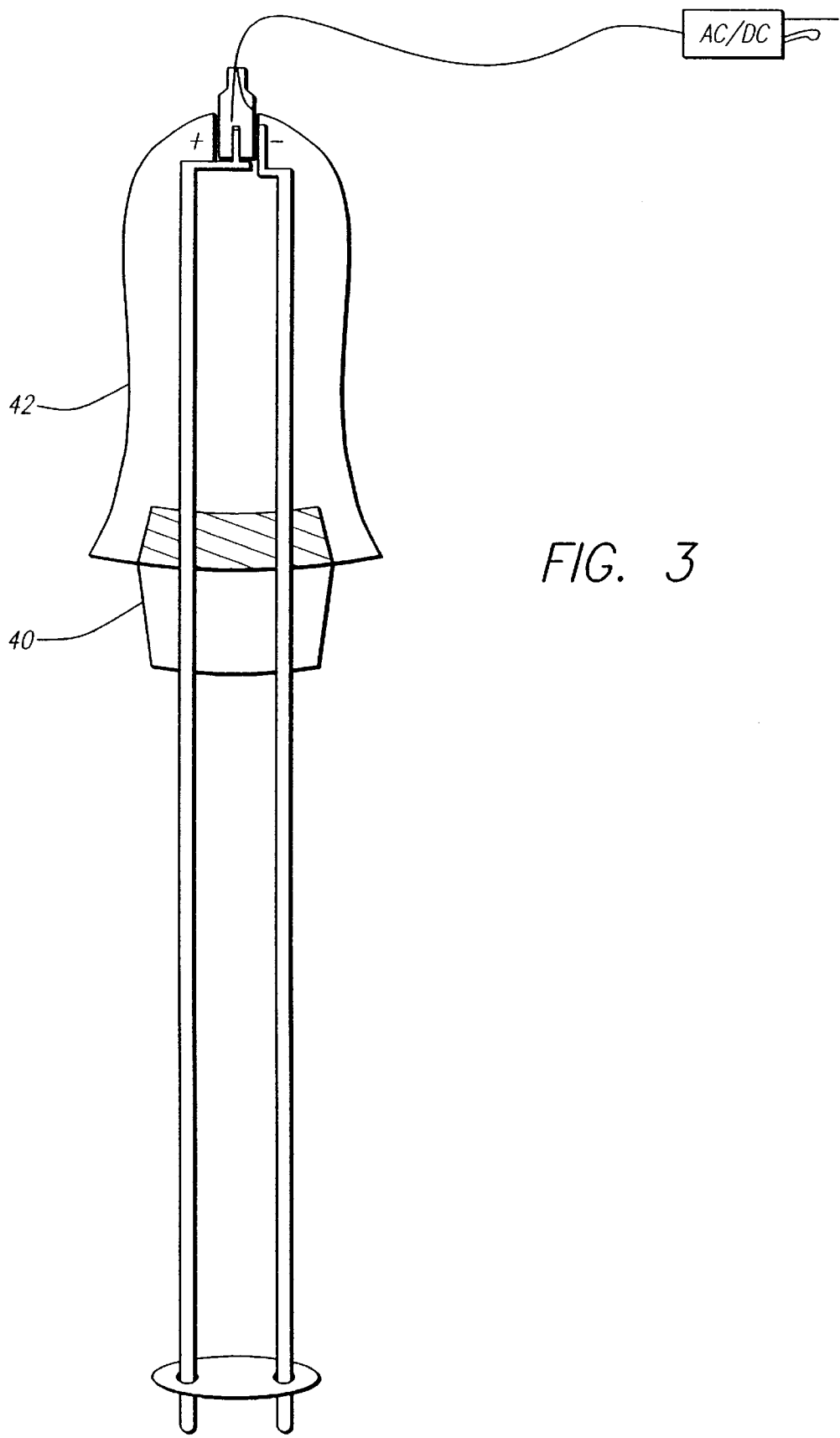
FIG. 3 is a view of another embodiment of the present invention showing the deionizing device and a bottle collar.

With reference to FIG. 3, there is shown an embodiment of the present invention which include collar 40 which is made of rubbed, cork, plastic or like material and which is in the shape of a normal wine bottle cork. Passing snugly through the collar 40 are the electrodes. Preferably, the collar is made from a soft plastic similar to the covering of a steering wheel, such as polyurethane. In use the device is placed into a freshly opened bottle of wine or other liquid to be treated, and the collar is wedged into the opening of the bottle. The device is then activated, and then removed whereby the sulfites in the wine or liquid as the case may be are substantially removed. A handle 42 can also be provided, as well as AC/DC adaptor 44. The handle can be made out of rubber, hard plastic, wood or the like.

Figure 4:
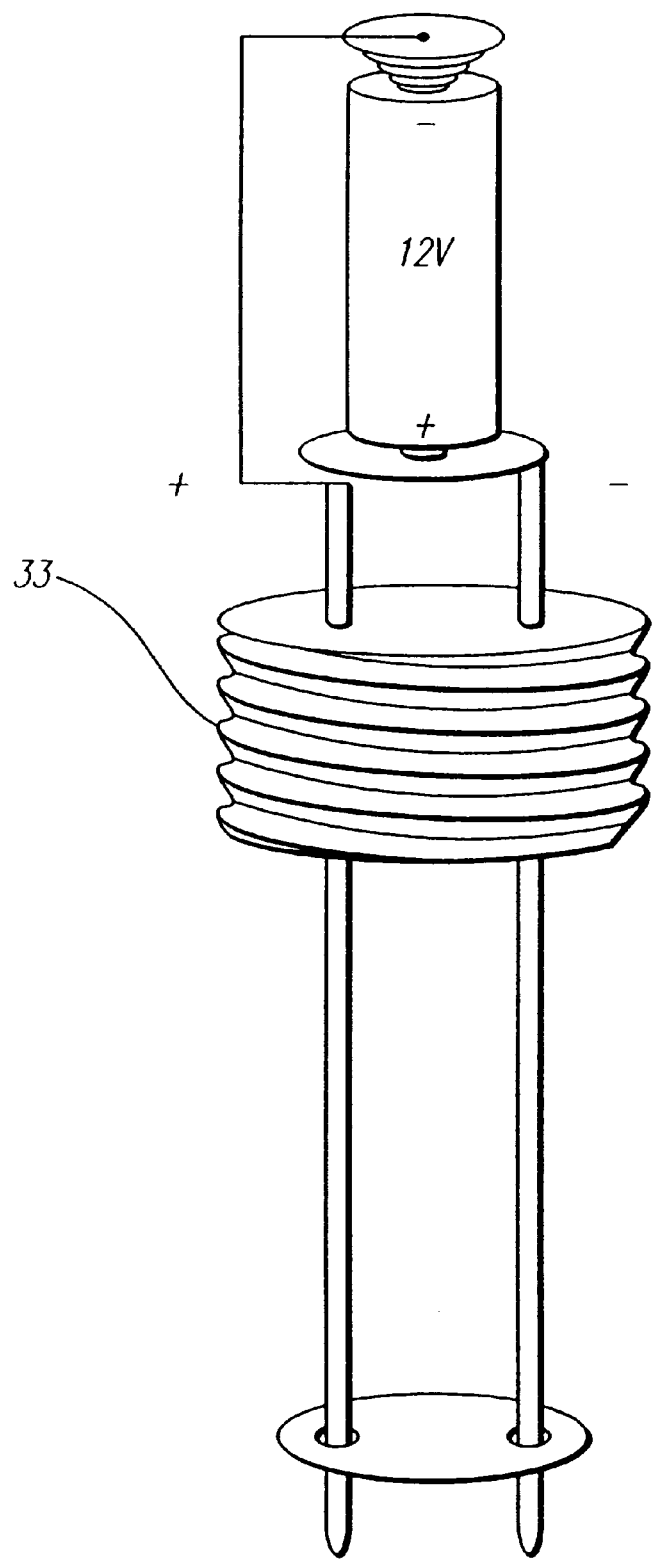
FIG. 4 is a view of another embodiment of the present invention showing the deionizing device adaptable to a threaded cap and body (switch not shown).

With reference to FIG. 4, there is shown another embodiment of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A hand held device for removing sulfite ions from wine comprising:

(A) a cylindrical housing;
   (B) a source of electric current;
   (C) a pair of electrode means for removing sulfite ions from wine connected to the source of electric current that are formed of non-ionizable material, including an anode and a cathode,
   (D) a visual indicator of electric current flow from the source of the electric current to at least one electrode means.

2. The hand held device for removing sulfite ions from wine of claim 1, further comprising a second removable housing that covers at least the electrode means.

3. The hand held device for removing sulfite ions from wine of claim 1, wherein the electrode means are formed of a non-ionizable metal.

4. The hand held device for removing sulfite ions from wine of claim 1, wherein the cylindrical housing includes a cylindrical fitting to engage the orifice of a wine bottle.

* * * * *